United States Patent
Schober et al.

(10) Patent No.: US 12,356,431 B2
(45) Date of Patent: Jul. 8, 2025

(54) FREQUENCY-SELECTIVE LIGHT DORMANCY USING RESOURCE BLOCK SETS

(71) Applicant: Nokia Technologies Oy, Espoo (FI)

(72) Inventors: Karol Schober, Helsinki (FI); Jorma Kaikkonen, Oulu (FI); Mads Lauridsen, Gistrup (DK); Timo Lunttila, Espoo (FI); Navin Hathiramani, Coppell, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 413 days.

(21) Appl. No.: 18/000,373

(22) PCT Filed: Jun. 3, 2021

(86) PCT No.: PCT/FI2021/050411
§ 371 (c)(1),
(2) Date: Nov. 30, 2022

(87) PCT Pub. No.: WO2022/029364
PCT Pub. Date: Feb. 10, 2022

(65) Prior Publication Data
US 2023/0224924 A1    Jul. 13, 2023

Related U.S. Application Data

(60) Provisional application No. 63/062,738, filed on Aug. 7, 2020.

(51) Int. Cl.
H04W 72/232    (2023.01)
H04W 72/1263    (2023.01)

(52) U.S. Cl.
CPC ..... *H04W 72/232* (2023.01); *H04W 72/1263* (2013.01)

(58) Field of Classification Search
CPC ........... H04W 72/232; H04W 72/1263; H04W 72/23; H04L 5/001; H04L 5/0053;
(Continued)

(56) References Cited

U.S. PATENT DOCUMENTS 5,095,531 A * 3/1992 Ito .................. H04W 16/32
                                                                        455/435.3
12,238,739 B2 * 2/2025 Wu ...................... H04W 72/23
(Continued)

FOREIGN PATENT DOCUMENTS

EP    3627910 A1    3/2020

OTHER PUBLICATIONS

ETSI, TS 138 213 V16.2.0, "5G; NR; Physical layer procedures for control (3GPP TS 38.213 version 16.2.0 Release 16)", Jul. 2020 (Year: 2020).*

(Continued)

*Primary Examiner* — Ayaz R Sheikh
*Assistant Examiner* — Tarell A Hampton
(74) *Attorney, Agent, or Firm* — Robert P. Michal, Esq.; Carter, DeLuca & Farrell LLP

(57) ABSTRACT

Systems, methods, apparatuses, and computer program products for user equipment (UE) power saving utilizing resource block (RB)-sets are provided.

5 Claims, 9 Drawing Sheets

(58) Field of Classification Search
CPC . H04L 27/0006; H04L 5/0048; H04L 5/0094; Y02D 30/70
See application file for complete search history.

(56) References Cited

U.S. PATENT DOCUMENTS

| | | | | |
|---|---|---|---|---|
| 2004/0127221 | A1* | 7/2004 | Takano | H04W 88/08 455/445 |
| 2010/0323627 | A1* | 12/2010 | Alanara | H04B 17/24 455/67.11 |
| 2013/0155969 | A1* | 6/2013 | Moon | H04W 72/23 370/329 |
| 2015/0245266 | A1* | 8/2015 | Lee | H04W 36/16 455/436 |
| 2018/0359755 | A1 | 12/2018 | Sun et al. | |
| 2019/0021052 | A1* | 1/2019 | Kadiri | H04L 5/0098 |
| 2019/0159167 | A1* | 5/2019 | Wong | H04W 72/23 |
| 2019/0222360 | A1* | 7/2019 | Nam | H04W 28/06 |
| 2019/0342898 | A1* | 11/2019 | Nam | H04W 72/0446 |
| 2020/0037260 | A1* | 1/2020 | Fu | H04W 52/325 |
| 2020/0245333 | A1 | 7/2020 | Lin et al. | |
| 2022/0141857 | A1* | 5/2022 | Lee | H04W 72/23 370/329 |
| 2022/0190981 | A1* | 6/2022 | Xu | H04L 1/1671 |
| 2022/0312444 | A1* | 9/2022 | He | H04L 5/0053 |
| 2022/0312465 | A1* | 9/2022 | He | H04L 5/0092 |
| 2023/0171701 | A1* | 6/2023 | Xu | H04W 52/0232 370/318 |
| 2023/0180260 | A1* | 6/2023 | Nogami | H04W 72/231 370/329 |

OTHER PUBLICATIONS

"3rd Generation Partnership Project; Technical Specification Group Radio Access Network; NR; Physical layer procedures for control (Release 16)", 3GPP TS 38.213, V16.2.0, Jun. 2020, pp. 1-176.

"New WID: UE Power Saving Enhancements", 3GPP TSG RAN Meeting #86, RP-193239, Agenda: 9.1.2, MediaTek Inc, Dec. 9-12, 2019, 5 pages.

"3rd Generation Partnership Project; Technical Specification Group Radio Access Network; NR; Physical channels and modulation (Release 16)", 3GPP TS 38.211, V16.2.0, Jun. 2020, pp. 1-131.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

"Views on power saving enhancement", 3GPP TSG RAN WG1 #101, R1-2003489, Agenda: 7.2.7.4, ZTE, May 25-Jun. 5, 2020, pp. 1-11.

"UE power saving using search space set switching", 3GPP TSG RAN WG1 #101-e, R1-2004360, Agenda: 7.2.7.4, Ericsson, May 25-Jun. 5, 2020, 6 pages.

"3rd Generation Partnership Project; Technical Specification Group Radio Access Network; NR; Physical layer procedures for data (Release 16)", 3GPP TS 38.214, V16.2.0, Jun. 2020, pp. 1-163.

International Search Report and Written Opinion received for corresponding Patent Cooperation Treaty Application No. PCT/FI2021/050411, dated Oct. 4, 2021, 20 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

* cited by examiner

| bitmap contents | | | | | | | | |
|---|---|---|---|---|---|---|---|---|
| "0" | RB set not available | | | x | | UE not monitoring an RB set | | |
| "1" | RB set available | | | | | solid fill = RB set monitored | | |
| frequency | | | | | | | | |
| RB set #0 | DCI 2_0 "1000" | no DCI 2_0 | DCI 2_0 "1000" | no DCI 2_0 | no DCI 2_0 | DCI 2_0 "1000" | no DCI 2_0 | no DCI 2_0 |
| RB set #1 | | x | x | x | x | x | x | x |
| RB set #2 | | x | x | x | x | x | | |
| RB set #3 | | x | x | x | x | x | x | x |

FREQUENCY-SELECTIVE LIGHT DORMANCY USING RESOURCE BLOCK SETS

RELATED APPLICATION

This application was originally filed as PCT Application No. PCT/FI2021/050411, filed on Jun. 3, 2021, which claims priority from U.S. Provisional Application No. 63/062,738, filed Aug. 7, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for user equipment (UE) power saving utilizing resource block (RB)-sets.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

In accordance with some embodiments, a method may include receiving, at user equipment, a configuration for resource block (RB) sets comprising at least one primary RB set. The method may further include monitoring physical downlink control channel (PDCCH) for downlink control information (DCI) on the at least one primary RB set for indicating one or more active and inactive RB sets. The method may further include when DCI is detected, determining which of the RB sets are active or inactive, wherein the determined RB sets are considered active or inactive until a subsequent monitoring occasion for physical downlink control channel (PDCCH) for downlink control information (DCI).

In accordance with some embodiments, an apparatus may include means for receiving a configuration for resource block (RB) sets comprising at least one primary RB set. The apparatus may further include means for monitoring physical downlink control channel (PDCCH) for downlink control information (DCI) on the at least one primary RB set for indicating one or more active and inactive RB sets. The apparatus may further include means for determining which of the RB sets are active or inactive, when DCI is detected, wherein the determined RB sets are considered active or inactive until a subsequent monitoring occasion for physical downlink control channel (PDCCH) for downlink control information (DCI).

In accordance with various embodiments, an apparatus may include at least one processor and at least one memory including computer program code. The at least one memory and the computer program code may be configured to, with the at least one processor, cause the apparatus to at least receive a configuration for resource block (RB) sets comprising at least one primary RB set. The at least one memory and the computer program code may be further configured to, with the at least one processor, cause the apparatus to at least monitor physical downlink control channel (PDCCH) for downlink control information (DCI) on the at least one primary RB set for indicating one or more active and inactive RB sets. The at least one memory and the computer program code may be further configured to, with the at least one processor, cause the apparatus to at least determine which of the RB sets are active or inactive, when DCI is detected, wherein the determined RB sets are considered active or inactive until a subsequent monitoring occasion for physical downlink control channel (PDCCH) for downlink control information (DCI).

In accordance with certain embodiments, a computer program product may perform a method. The method may include receiving, at user equipment, a configuration for resource block (RB) sets comprising at least one primary RB set. The method may further include monitoring physical downlink control channel (PDCCH) for downlink control information (DCI) on the at least one primary RB set for indicating one or more active and inactive RB sets. The method may further include when DCI is detected, determining which of the RB sets are active or inactive, wherein the determined RB sets are considered active or inactive until a subsequent monitoring occasion for physical downlink control channel (PDCCH) for downlink control information (DCI).

In accordance with some embodiments, a method may include receiving, at a user equipment (UE) from a serving node, a configuration for triggering event based dormancy, the configuration comprising at least one dormancy triggering criteria and one or more exit conditions for the dormancy, wherein the dormancy comprises resource block (RB)-set dormancy. The method may further include when the at least one dormancy triggering criteria is met, starting a user equipment dormancy state until at least one of the exit conditions are met.

In accordance with some embodiments, an apparatus may include means for receiving a configuration for triggering event based dormancy, the configuration comprising at least one dormancy triggering criteria and one or more exit conditions for the dormancy, wherein the dormancy comprises resource block (RB)-set dormancy. The apparatus may further include means for starting a user equipment dormancy state, when the at least one dormancy triggering criteria is met, until at least one of the exit conditions are met.

In accordance with various embodiments, an apparatus may include at least one processor and at least one memory including computer program code. The at least one memory and the computer program code may be configured to, with the at least one processor, cause the apparatus to at least receive a configuration for triggering event based dormancy, the configuration comprising at least one dormancy triggering criteria and one or more exit conditions for the dormancy, wherein the dormancy comprises resource block (RB)-set dormancy. The at least one memory and the computer program code may be further configured to, with the at least one processor, cause the apparatus to at least start a user equipment dormancy state, when the at least one dormancy triggering criteria is met, until at least one of the exit conditions are met.

In accordance with certain embodiments, a computer program product may perform a method. The method may include receiving, at a user equipment (UE) from a serving node, a configuration for triggering event based dormancy, the configuration comprising at least one dormancy triggering criteria and one or more exit conditions for the dormancy, wherein the dormancy comprises resource block (RB)-set dormancy. The method may further include when the at least one dormancy triggering criteria is met, starting a user equipment dormancy state until at least one of the exit conditions are met.

In accordance with some embodiments, a method may include transmitting, from a network node to at least one user equipment (UE), a configuration for event based dormancy triggering and exit condition(s). The method may further include when a blocking event is detected for the at least one user equipment (UE) that has been configured to activate RB set, suspending uplink (UL) and/or downlink (DL) scheduling for the at least one user equipment (UE) and initiating a scheduling suspension timer.

In accordance with some embodiments, an apparatus may include means for transmitting a configuration for event based dormancy triggering and exit condition(s). The apparatus may further include means for suspending uplink (UL) and/or downlink (DL) scheduling for the at least one user equipment (UE) and initiating a scheduling suspension timer, when a blocking event is detected for the at least one user equipment (UE) that has been configured to activate RB set.

In accordance with various embodiments, an apparatus may include at least one processor and at least one memory including computer program code. The at least one memory and the computer program code may be configured to, with the at least one processor, cause the apparatus to at least transmit a configuration for event based dormancy triggering and exit condition(s). The at least one memory and the computer program code may be further configured to, with the at least one processor, cause the apparatus to at least suspend uplink (UL) and/or downlink (DL) scheduling for the at least one user equipment (UE) and initiate a scheduling suspension timer, when a blocking event is detected for the at least one user equipment (UE) that has been configured to activate RB set.

In accordance with certain embodiments, a computer program product may perform a method. The method may include transmitting, from a network node to at least one user equipment (UE), a configuration for event based dormancy triggering and exit condition(s). The method may further include when a blocking event is detected for the at least one user equipment (UE) that has been configured to activate RB set, suspending uplink (UL) and/or downlink (DL) scheduling for the at least one user equipment (UE) and initiating a scheduling suspension timer.

BRIEF DESCRIPTION OF THE DRAWINGS

For proper understanding of example embodiments, reference should be made to the accompanying drawings, wherein:

FIG. 2 illustrates an example embodiment where a UE does not expect to be indicated with all RB-set as unavailable;

FIG. 3 illustrates an example embodiment where a UE may be indicated with all RB-sets as unavailable;

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for user equipment (UE) power saving utilizing resource block (RB)-sets, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain example embodiments may generally relate to user equipment (UE) power saving enhancements for licensed spectrum. One objective related to UE power saving involves physical downlink control channel (PDCCH) monitoring reductions in radio resource control (RRC) connected mode. For example, some embodiments may relate to enhancements on power saving techniques for connected-mode UE, subject to minimized system performance impact. This might include but is not limited to, for instance, extensions to downlink control information (DCI)-based power saving adaptation during discontinuous reception (DRX) active time for an active bandwidth part (BWP), including PDCCH monitoring reduction when connected mode DRX (C-DRX) is configured.

Meanwhile, in context of NR-unlicensed (NR-U), the concept of resource block sets (RB-sets) have been developed. As discussed in the following, some example embodiments provide for the use of RB-sets to inform UE that gNB has not obtained channel and UE does not need to monitor PDCCH candidates in that channel for a period of time.

Figure 1:
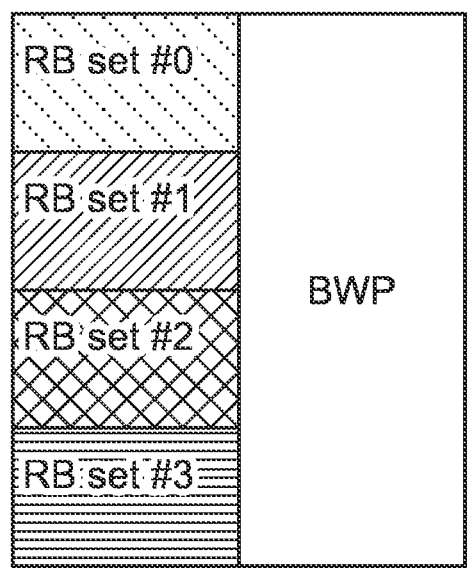
FIG. 1 illustrates an example of RB-sets, according to an embodiment.

For a downlink (DL) carrier where no intra-cell guard bands are configured with intraCellGuardBandDL-r16, the DL carrier can be configured with $N_{(RB\text{-}set,DL)} \geq 1$ non-overlapping RB set(s). For each RB set except for RB set 0, the starting CRB index may be given by startCRB-r16. For RB set 0, the starting CRB index may be given by the parameter $N_{grid,DL}^{start,\mu}$, as defined in 3GPP TS 38.211. The UE expects that nrofCRBs-r16 is set to 0 for all guard bands (GBs) between two adjacent RB sets within the DL carrier. FIG. 1 illustrates an example of RB-sets within a NR-U BWP. An RB-set should correspond to a 20 MHz channel in NR-U, as illustrated in FIG. 1, but this restriction can be relieved for licensed carrier applications.

In 3GPP Release-16 NR-U, a UE may be indicated that an RB-set/carrier is not available and, if so, the UE may cancel channel state information reference signal (CSI-RS) reception and/or cancel PDCCH monitoring, on the physical resource blocks (PRBs) belonging to the RB set until the end of indicated channel occupancy time (COT).

For NR-U, there can be multiple RB-sets indication bits (one per configured RB-set) in DCI format 2_0 if there are non-zero GBs between RB-sets. For a licensed carrier, such a restriction could be relieved and there could be multiple bits in DCI format 2_0, e.g., one bit per RB-set even if GBs are set to be zero-sized.

The availability of RB sets may be indicated to the UE dynamically with one or more bits in the DCI 2_0. For example, the availability of RB sets may be indicated with one bit, if intraCellGuardBandDL-r16 for the serving cell indicates no intra-cell guard-bands are configured, where a value of '1' indicates that the serving cell is available for receptions, a value of '0' indicates that the serving cell is not available for receptions, by availableRB-SetPerCell-r16, and the serving cell remains available or unavailable for reception until the end of the indicated channel occupancy duration. Alternatively or additionally, the availability of RB sets may be indicated with a bitmap having a one-to-one mapping with the RB sets of the serving cell, if intraCellGuardBandDL-r16 for the serving cell indicates intra-cell guard-bands are configured, where the bitmap includes $N_{(RB,set,DL)}$ bits and $N_{(RB,set,DL)}$ is the number of RB sets in the serving cell, a value of '10' indicates that an RB set is available for receptions, and a value of '01' indicates that an RB set is not available for receptions, by availableRB-SetPerCell-r16. The RB set indicator field includes $N_{(RB,sets)}$ bits where $N_{(RB,sets)}$ is the number of RB sets in the serving cell. And, an RB set remains available or unavailable for receptions until the end of the indicated channel occupancy duration. If a UE is provided availableRB-SetPerCell-r16, the UE is not required to monitor PDCCH candidates that overlap with any RB from RB sets that are indicated as unavailable for receptions by DCI format 2_0.

NR supports indication of COT end with DCI 2_0. On the licensed spectrum, COT-end cannot be indicated (as there is no channel occupancy time to begin with). In NR-U, slot format indication (SFI)-end can also be used as COT-end; however, on a licensed carrier, SFI-end should not automatically mean that UE shuts PDCCH monitoring off. A UE's PDCCH monitoring can be turned off by indicating slots as uplink (UL), but in licensed band operation, where semi-static TDD pattern is typically mandated by regulations, a gNB cannot dynamically indicate UL on top of semi-statically (via time division duplex (TDD) configuration/semi-static-SFI) configured DL slots.

Dormancy in Release-16 is implemented by BWP switching upon UE-specific layer 1 (L1) indication and one BWP is configured without PDSCH and PDCCH parameters is called dormant. Also, in Release-16, a new functionality for restricting the applied scheduling slot offset (K0/K2) was introduced. Power saving is enabled by indicating (e.g., via DCI) to the UE what minimum scheduling offset it can assume among the configured values (2 per DL/UL) and, if scheduling slot offset restriction (K0 for PDSCH/K2 for PUSCH) is >0, the UE may apply micro-sleep in receiver (stopping the reception after PDCCH symbols) and process the received PDCCH slower, thereby attaining power saving. According to the agreed UE power model, the PDCCH monitoring during cross-slot scheduling consumes 70 power units, while PDCCH monitoring with same-slot scheduling consumes 100 power units. Deep sleep consumes 1 power unit, while micro sleep consumes 45 power units.

Allowing for a UE to stop monitoring some of the PRBs in a flexible and dynamic manner is an attractive concept for UE power saving. However, current approaches for UE power saving do not yet facilitate this. As discussed above, there are RB sets defined for NR-U; however, even this NR-U RB-set solution is not flexible enough for optimized power savings in all scenarios.

If an RB set is indicated as "not available," the UE does not need to monitor PDCCH, receive CSI-RS, etcetera on it, irrespective of what the slot format indicator (SFI) indicating UL/DL/flexible symbols says.

Therefore, one issue may relate to how to indicate the duration that the indicated availability of an RB set is valid. Additionally, another issue may relate to what the UE behavior should be when RB-set is indicated available or unavailable.

Furthermore, due to propagation characteristics inherent to mmWave bands, short term blocking of the signals between UEs and serving cell may occur. The frequency and duration of these short term blocking events are highly dependent on the deployment scenarios. Currently, during short term blocking events, UEs would follow UE configured DRX cycles, however UE dormancy gains could be further enhanced.

As introduced above, certain example embodiments provide methods for UE power saving, e.g., utilizing RB-sets defined for NR-U to indicate which listen-before-talk (e.g., 20 MHz LBT) sub-bands are used by gNB as baseline. It is noted that example embodiments are not limited to unlicensed spectrum, however. More specifically, an example embodiment provides rules for when and how the UE may monitor signals on PRBs belonging to different RB sets.

In one example embodiment, after an RB set has been indicated as not available, the UE does not need to monitor PDCCH candidates or the UE does not expect to be scheduled/receive DL or UL transmissions on PRBs that at least partially overlap with the RB-sets indicated as not available. According to an embodiment, the indication is valid until the UE receives another DCI 2_0 indicating that the RB set is again available.

Thus, some embodiments may relate to determining when and where to monitor for the RB set indication. In one embodiment, monitoring may be based on the definition of a primary RB-set(s). For instance, according to an embodiment, the location of the bits for RB set indication (e.g., in DCI format 2_0) is configured UE-specifically {positionInDCI, servingCellId} and such group common DCI format may be used in an user-specific way, alternatively RB-set indication bits could be present in user-specific DCI format. In other words, DCI format 2_0 is only an example and any DCI format may carry RB-set indication.

In some variants, the primary RB-set(s) is/are not allowed to be indicated as unavailable. For example, the primary RB-set may be allowed to vary over time, e.g., if there is high load in the current primary RB-set. In an embodiment, when DCI 2_0 periodicity is low (e.g., for purpose or SFI or other content of the DCI 2_0), a gNB may configure a parameter with which it guarantees that RB-set indication is kept constant for multiples of the DCI 2_0 monitoring periodicity, which may be called RB-set-indicator-validity.

In some variants, the RB sets may be allowed to be indicated as unavailable, however. For example, the UE may still monitor, e.g., periodically one or more primary RB sets for at least DCI 2_0 containing RB-set indication. In an embodiment, RB-set-indicator-validity may be applicable when all RB-sets are unavailable.

In another variant, the UE may be allowed to autonomously enable dormancy for RB-sets (i.e. set one or more RB-sets to inactive state) based on semi-statically triggered thresholds. For example, this could be applied to frequency range 2 (FR2) blocking scenarios. In an embodiment, the UE may periodically monitor DCI 2_0 to assess for channel condition improvements and at the same time enable UE dormancy. Upon detection of improved channel conditions, based on the criteria established by the serving cell, the UE may inform the network of this event via, for example, a scheduling request (SR).

In further example embodiments, RB-sets may be configured to have unequal sizes (unlike in NR-Unlicensed). According to one embodiment, DCI format (e.g., DCI 1_1) size is not changed based on RB-set availability, i.e., no BWP switch shall occur and UE expects that parts of the active BWPs will not be scheduled by the gNB. In a further embodiment, instead of preventing, e.g., PDSCH scheduling on PRBs that (fully or partially) overlap with unavailable RB-sets, there would be restriction for the scheduling slot offset for the case that, e.g., the scheduled PDSCH allocation overlaps with RB-sets that are not available but indicated to be activated/available. In other words, gNB may also activate non-active RB-set(s) just by scheduling PDSCH or PUSCH on those, with non-zero time scheduling slot offset.

FIG. 2 illustrates an example embodiment where a UE does not expect to be indicated with all RB-set as unavailable. In the example of FIG. 2, RB-set #0 is regarded as the primary RB-set. In an embodiment, a gNB may configure TYPE-3 common search space (CSS) for DCI format 2_0 within this RB-set #0, such that it is confined within the RB-set. This can be achieved, for example, by configuring additional control resource set (CORESET) which is confined within RB-set #0 or configure TYPE-3 CSS with monitoring location only within RB-set #0 (as part of Release-16 CORESET mirroring feature). In this variant, a UE cannot achieve a complete stop of PDCCH monitoring, but monitoring may be performed with reduced bandwidth (BW) and reduced number of candidates (within RB-set #0), such as those of TYPE-3 CSS.

Figure 3:
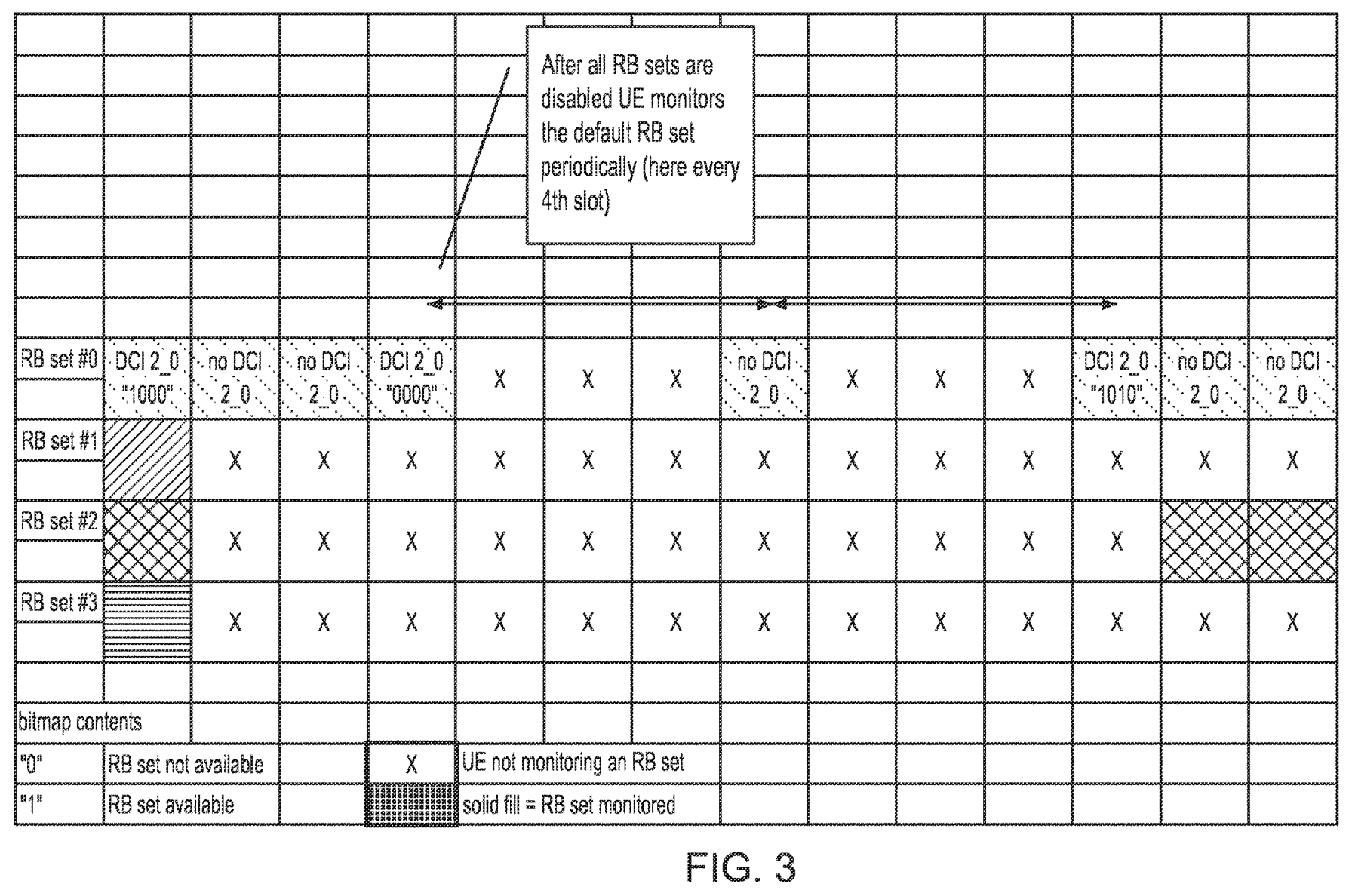

FIG. 3 illustrates an example embodiment where a UE may be indicated with all RB-sets as unavailable. In the example of FIG. 3, each column corresponds to one time slot. As illustrated in the example of FIG. 3, RB-set #0 may be indicated to be unavailable, but monitoring is reduced to SFI-radio network temporary identifier (RNTI) and TYPE3-CSS where DCI 2_0 is monitored. In addition, a guaranteed period (when primary RB-set is available) of RB-set indication can be configured. In the example of FIG. 3, the RB set validity indicator (RB-set-indicator-validity) is set to four periods of DCI 2_0 monitoring periodicity (being 1 slot).

Figure 4:
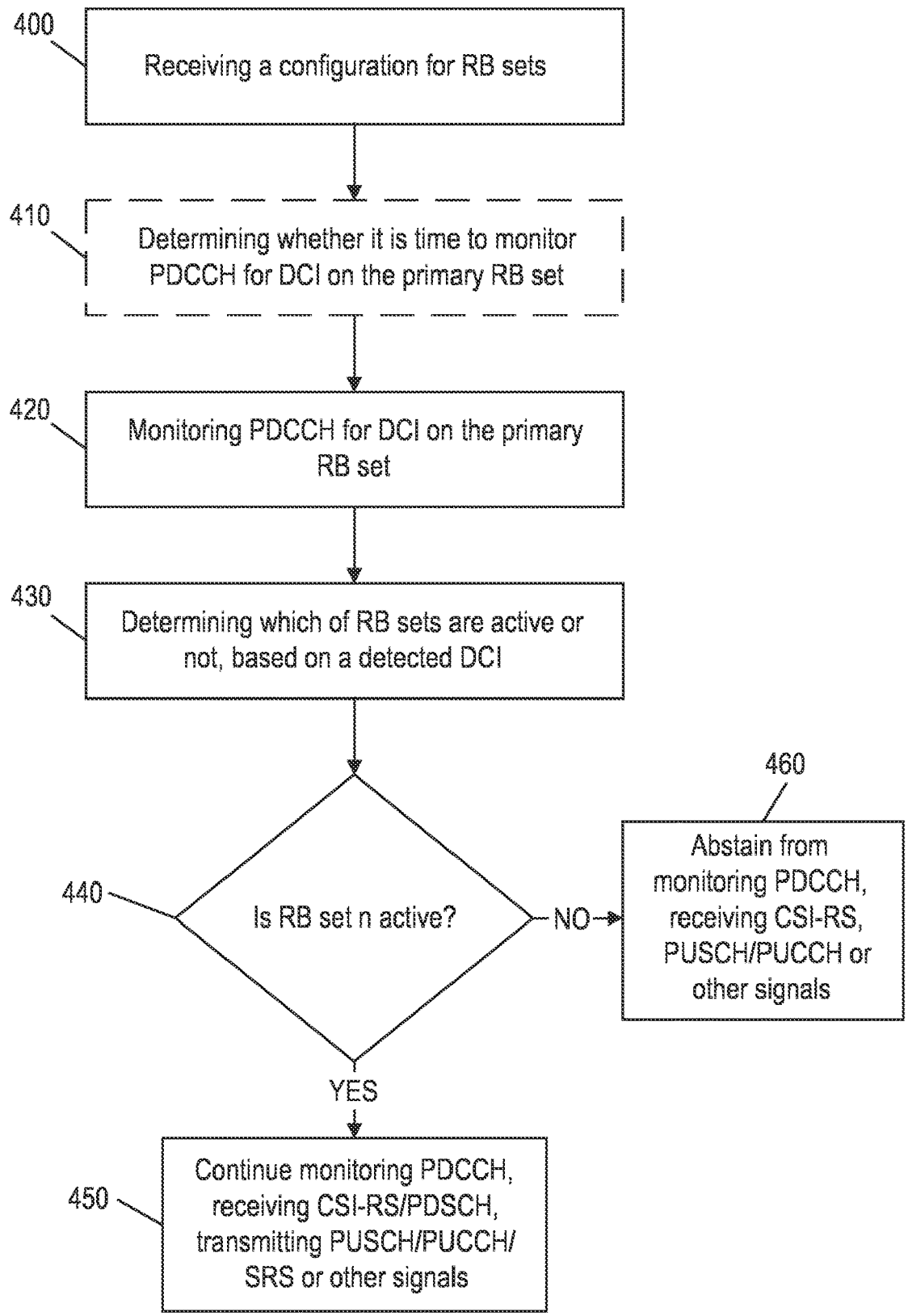
FIG. 4 illustrates an example flow chart of a method of UE power saving using RB-sets, according to one embodiment.

FIG. 4 illustrates an example flow chart of a method of UE power saving using RB-sets, according to one embodiment. In some example embodiments, the method of FIG. 4 may be performed by a network node or element, such as a UE, mobile station, mobile device, mobile unit, mobile equipment, user device, subscriber station, wireless terminal, tablet, smart phone, stationary device, IoT device, NB-IoT device, sensor, and/or other device.

As illustrated in the example of FIG. 4, the method may include, at 400, receiving a configuration for RB sets. In one example, the configuration for RB sets may include one or more primary RB sets. For example, in an embodiment, the configuration for RB sets may include sizes of RB sets (PRBs) (e.g., by configuring zero GB between RB sets (but not limited to)), an indication of whether one of the RB sets is a primary RB set (e.g., can be determined implicitly by PDCCH candidates for GC-PDCCH), a (K0) cross-slot scheduling value, number of bits in the DCI (e.g., DCI 2_0) where the bits may indicate whether one of the RB sets is active or inactive, and/or RB set validity indicator parameter (RB-set-indicator-validity), etc. In one example, the RB set validity indicator parameter may be configured as multiple of group common PDCCH (GC-PDCCH) monitoring periodicity, and applicable generally or applicable when all RB-set are indicated unavailable.

As further illustrated in the example of FIG. 4, the method may optionally include, at 410, determining whether it is time to monitor PDCCH for DCI on the primary RB set(s). In other words, according to one embodiment, the method may include determining a subsequent monitoring occasion on the primary RB set(s). For instance, the determining 410 may apply for the variant having the possibility to indicate all RB-sets unavailable. In an embodiment, the method may include, at 420, monitoring PDCCH for DCI on the primary RB set(s), from among the RB sets, for indicating one or more active and inactive RB set(s). In an embodiment, the monitoring 420 may be continuous or periodic, for example. The method may also include, at 430, based on a detected DCI, determining which of the RB sets are active or inactive. According to an embodiment, the determined RB sets may be considered active or inactive until a subsequent monitoring occasion for PDCCH for DCI. In an example embodiment, the DCI may include, but is not limited to, DCI format 2_0.

As also illustrated in the example of FIG. 4, the method may include, at 440, determining if an RB set n is active. If the RB set is active, then the method may include, at 450, continuing monitoring PDCCH and receiving CSI-RS/PDSCH, transmitting PUSCH/PUCCH/SRS or other signals. If the RB set is not active, then the method may include, at 460, abstaining from monitoring PDCCH and receiving CSI-RS/PDSCH or other signals, transmitting PUSCH/PUCCH/SRS or other signals. According to a further embodiment, for an inactive RB set, the method may include continuing monitoring PDCCH when the inactive RB set is configured as a primary RB set.

Furthermore, in order to confine PDCCH within RB-set, a gNB may use a CORESET mirroring feature, although example embodiments can work even without this feature. Therefore, in one embodiment, a method may include, when CORESET mirroring feature is utilized, for the case of unequal RB set size, determining a mirroring CORESET scaling factor for a particular RB set. Assuming that the CORESET mirroring feature is utilized, when RB-set becomes unequal in size, a mirroring CORESET scaling factor may be introduced. As one example, when primary RB-set 0 is 20 MHz and RB-set 1 is 60 MHz, a bit in a bitmap configuring CORESET corresponds to 6RBs in RB-set #0 and 18RBs in RB-set #1.

In one variant, a primary RB-set may be configured mainly for PDCCH monitoring. Since the UE power model indicates the power consumption is bandwidth dependent (e.g., scaling factor=max(50,0.4+0.6*(x−20)/80, where x=[10,20,40,80,100] MHz and the scaling factor is applied to the reference power specified for 100 MHz), it may be beneficial to perform frequent PDCCH monitoring on a narrow bandwidth and then schedule data on a wider bandwidth to ensure the data transfer is completed fast. If downlink data is incoming, the DCI 2_0 on the primary RB-set can indicate activation of one of the other RB-sets and simultaneously schedule data on the newly activated RB-set (having a large BW to facilitate fast data transfer).

However, activation of a RB-set for PDSCH reception and/or PUSCH transmission may require certain delay. Certain embodiments provide alternatives for how to tackle such a delay in the provided framework. In one alternative, the cross-slot scheduling functionality (k0) may be applied to ensure data is available at the point in time where the RB set becomes active (i.e. k0=activation delay), thus a cross-RB-set and cross-slot scheduling function. In another alternative, a UE may autonomously wake up a few slots before the slot where it expects RB-set indication may change. In other words, in a slot where the UE monitors for DCI 2_0 containing a valid RB-set indicator field, the UE is prepared to receive PDSCH on any of the RB-sets. If RB-set-indicator-validity is applicable, in some received DCI format 2_0 PDCCH the UE does not expect RB-set indicator value to change, or does not consider the indicated value as valid.

As discussed above, short-term blocking events may lead to UE triggering beam failure indications and cell reselection procedures, which may further increase UE battery consumption. The above-described framework of dormancy where RB-sets can be dynamically activated and deactivated would be useful to address short-term blocking events in FR2. In the following examples, the case of RB-sets being inactive may be referred to as RB-set based dormancy.

Figure 5A:
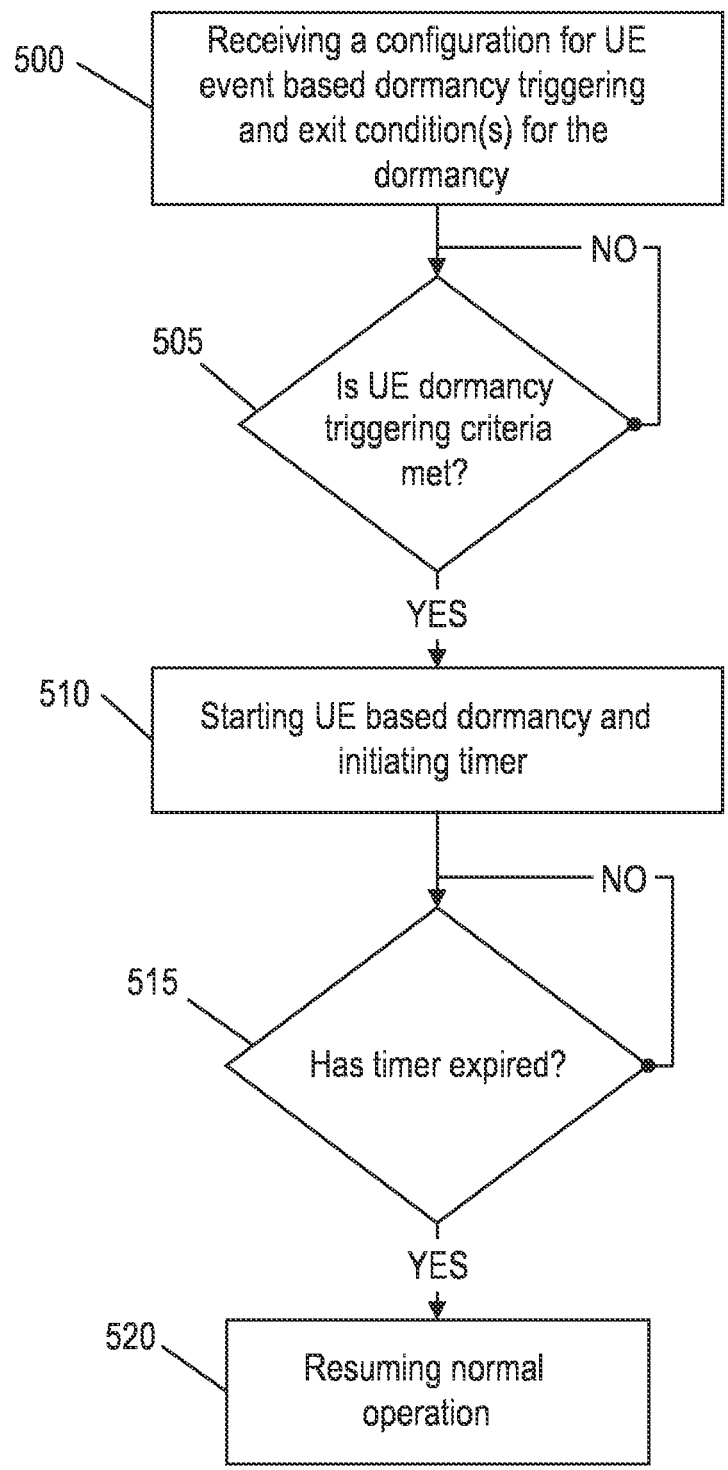
FIG. 5a illustrates an example flow diagram of a method, according to an embodiment.
Figure 5B:
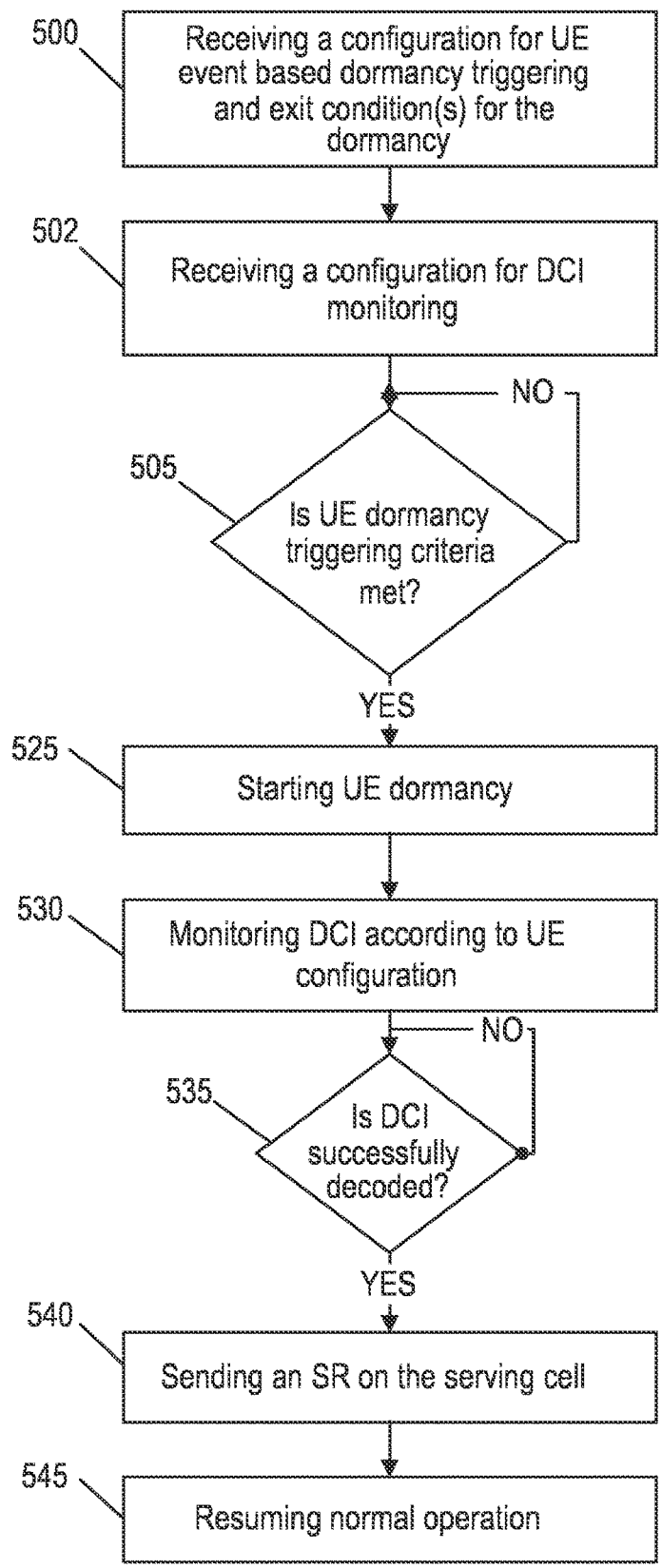
FIG. 5b illustrates an example flow diagram of a method, according to an embodiment.
Figure 5C:
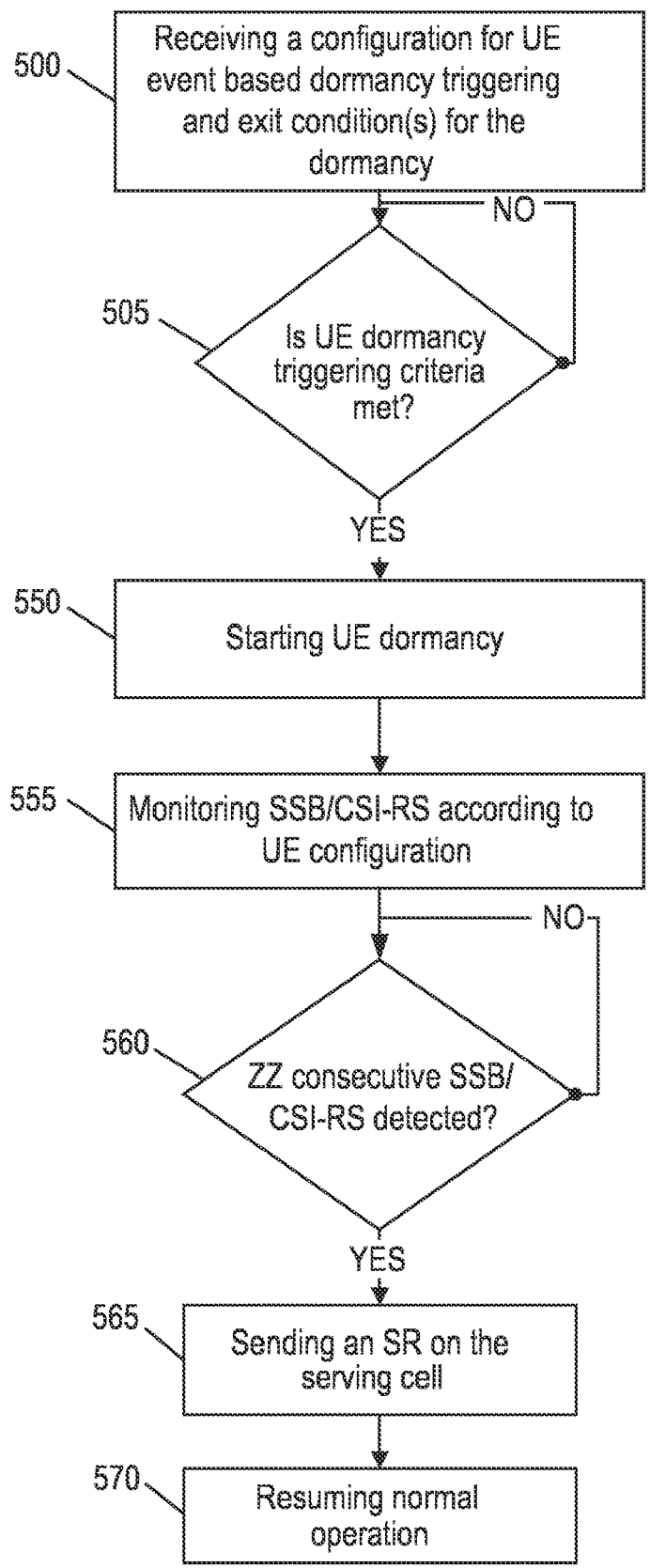
FIG. 5c illustrates an example flow diagram of a method, according to an embodiment.

FIGS. 5a, 5b and 5c illustrate an example flow diagram of a method for autonomously triggering RB-set based dormancy, according to an embodiment. In some example embodiments, the method of FIG. 5a, 5b or 5c may be performed by a network node or element, such as a UE, mobile station, mobile device, mobile unit, mobile equipment, user device, subscriber station, wireless terminal, tablet, smart phone, stationary device, IoT device, NB-IoT device, sensor, and/or other device. As provided herein, in certain embodiments, a UE may be allowed to autonomously trigger RB-set based dormancy, if enabled by the serving cell.

As illustrated in the examples of FIGS. 5a, 5b and 5c, at 500, the method may include receiving a configuration, from a serving node or cell, for triggering of event based dormancy and one or more exit condition(s) for the dormancy. As mentioned above, the dormancy may include RB-set dormancy, where the triggering of dormancy state may correspond to deactivating one or more RB sets and where the exit conditions correspond to activating one or more RB sets. In an example embodiment, a normal operation may apply to a state where one or more RB sets are active, and the normal operation may correspond to normal radio operation procedures including, for example, link failure detection mechanisms for a UE. For example, a serving cell (e.g., gNB) may semi-statically configure a UE with the triggering conditions to enable the dormancy and the criteria to exit the dormancy. In an embodiment, these triggering conditions may be, for example, based on: XX consecutive SR without a response and no DL transmission (TX) detected, and/or YY consecutive SSB/CSI-RS detection (e.g., similar to Qout monitoring of PDCCH for RLF detection) failures and no other DL signals detected. According to an embodiment, the exit condition(s) for the autonomously triggered dormancy may be based on at least one of the following: a certain number (ZZ) of consecutive SSB/CSI-RS detections, detection of DCI indicating active and inactive RB set(s) or another DCI, and/or a timer to establish the maximum time the UE should deactivate the RB set before resuming normal beam failure and detection procedures.

It is noted that FR2 cells may typically be configured with different SSB/CSI-RS periodicities to minimize overhead while minimizing impact on performance (e.g., cell reselection times). Depending on SSB/CSI-RS periodicity in relation with the typical blocking duration expected in the deployment scenario a certain criteria may be preferred.

It is further noted that, according to some embodiments, several exit criteria may be enabled in parallel. However, for purposes of illustration, FIGS. 5a, 5b and 5c respectively describe the UE behaviour for each criteria independently. However, the examples of FIGS. 5a, 5b and 5c may be combined in certain embodiments.

As illustrated in the examples of FIGS. 5a-5c, at 505, the method may include determining when a dormancy triggering criteria is met. As discussed in more detail below, when a dormancy criteria is met, the method may include starting a UE dormancy state until one or more of the exit conditions are met. For instance, if a dormancy criteria is met, and for example upon entering the dormancy state, the UE may abstain from all monitoring/reception if just timer based exit criteria is configured, as in the example of FIG. 5a. If the exit criteria is based on reception of DCI and/or SSB/CSI-RS, as in the examples of FIGS. 5b and 5c, then the UE may at least receive the SSB/CSI-RS and/or DCI based on its acquired configurations. In one example, DCI may include, but is not limited to, DCI format 2_0.

For the timer based exit criteria in the example of FIG. 5a, once the UE enters the dormancy state, it may initiate the configured timer at 510. Upon expiry of the timer expiry as determined at 515, the method may include resuming normal operation at 520. If one or more other exit criteria are configured along with the timer based exit criteria, and one of those exit criteria is triggered, then the timer for the exit based criteria may be stopped, according to an embodiment.

For DCI based exit criteria, as illustrated in the example of FIG. 5b, the method may include receiving a configuration for DCI monitoring at 502. When it is determined at 505 that the UE dormancy triggering criteria is met, the method may include the UE entering the dormancy state at 525 and monitoring at 530 at least DCI according to the configuration provided by the serving cell at 502. During the dormancy period, the UE may be configured to wake up on its DCI monitoring occasions and attempt to decode the DCI at 535. Upon successful decoding of the DCI, the method may include, at 540, informing the serving cell of the improved radio conditions via transmission of a SR. Then, at 545, the method may include the UE proceeding to normal connected mode operational procedures.

For SSB/CSI-RS based exit criteria, as illustrated in the example of FIG. 5c, when it is determined at 505 that the UE dormancy triggering criteria is met, the method may include the UE entering the dormancy state at 550. In the example of FIG. 5c, the method may include, at 555, monitoring at least SSB/CSI-RS transmissions according to the configuration provided by the serving cell. During the dormancy period, the UE may wake up on its SSB/CSI-RS monitoring occasions and perform measurements and/or decode PBCH. The exit criteria may, for example, establish a minimum RSRP prior to allowing the UE to exit the dormancy period. For example, in an embodiment, the method may include, at 560, determining whether a certain number of consecutive SSB/CSI-RS have been detected. Upon complying the exit criteria requirements, the method may include, at 565, informing the serving cell of the improved radio conditions via transmission of a SR and then, at 570, proceeding to normal connected mode operational procedures.

Figure 6:
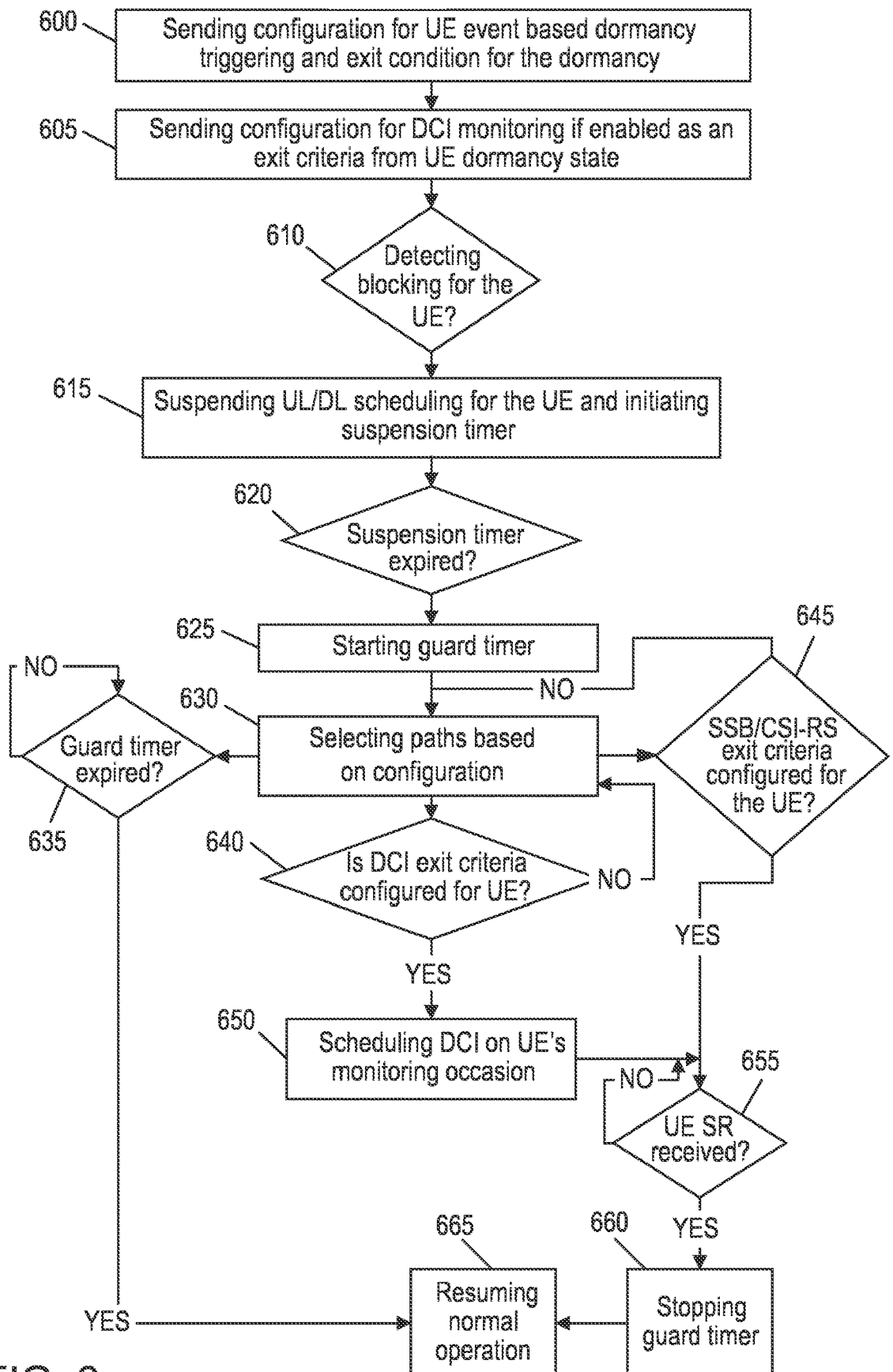
FIG. 6 illustrates an example flow diagram of a method, according to an embodiment.

FIG. 6 illustrates an example flow diagram of a method, according to an embodiment. In particular, FIG. 6 illustrates an example of serving cell actions upon configuring UEs autonomously enabled dormancy. Therefore, the method of FIG. 6 may be performed by a network node, host, or server in a communications network or serving such a network, such as a satellite, base station, a Node B, an evolved Node B (eNB), 5G Node B or access point, next generation Node B (NG-NB or gNB), transmission-reception point (TRP), high altitude platform station (HAPS), integrated access and backhaul (IAB) node, and/or WLAN access point, or the like.

As illustrated in the example of FIG. 6, the method may include, at 600, sending to one or more UE(s) a configuration for UE event based dormancy triggering and exit condition(s) for the dormancy. In one example embodiment, the method may optionally also include, at 605, sending configuration for DCI monitoring when it is enabled as an exit criteria from the UE dormancy state. When a blocking event is detected at 610 for a certain UE which has been configured to activate dormancy, the method may include, at 615, suspending UL/DL scheduling for the UE and initiating a suspension timer. According to some embodiments, the blocking event may include: when a DL signal falls below a predetermined threshold for a certain duration of time or number of occurrences, and/or when a certain DL measurement based metric exceeds or falls below predefined threshold. In certain embodiments, the detection of blocking at the serving cell may, for example, be performed based on a number of consecutive instances with absence of DL HARQ feedback and/or periodic measurement reports. In this scenario, the serving cell may initiate the suspension timer during which it would not attempt to schedule the blocked UE. This may further allow for efficient use of resources. For example, if analog beam forming is employed, the serving cell may have to schedule on the blocked UE's selected beam which may not have other users with data to schedule. Based on this, the introduction of a scheduling suspension timer that is approximately the minimum duration of short-term blocking events can be beneficial. Upon the expiry of the scheduling suspension timer at 620, the method may include initiating, at 625, a guard timer that establishes the maximum time for short term blocking and, at 630, selecting paths based on the configuration. When the guard timer expires at 635, the method may include, at 665, resuming normal radio operation procedures including, e.g., link failure detection mechanisms for the UE.

If, at 640, the blocked UE is configured with DCI 2_0 exit criteria, after the guard timer has started, the method may include proceeding to periodically transmit DCI on the UEs monitoring occasions at 650. Upon the reception of a SR from the blocked UE at 655, the method may include at 660 stopping the guard timer and resuming normal operation at 665. If no SR is received, the guard timer expiry would lead to the serving cell resuming normal operation at 665.

If the serving cell configured the blocked UE with SSB/CSI-RS exit criteria at 645, after the guard timer has started, the method may include waiting for the reception of a SR from the blocked UE at 665. If a SR is received from the blocked UE, the method may include stopping the guard timer at 660, and resuming normal operation at 665. If no SR is received, the guard timer expiry would lead to resuming normal operation at 665.

Figure 7A:
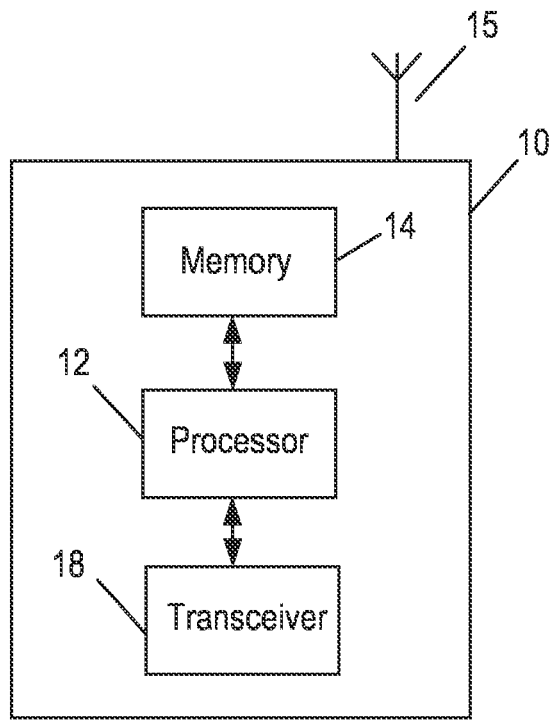
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), TRP, high altitude platform station (HAPS), integrated access and backhaul (IAB) node, and/or WLAN access point, associated with a radio access network, such as a LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 7a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. For example, in some embodiments, apparatus 10 may be configured to perform one or more of the processes depicted in any of the flow charts or signaling diagrams described herein, such as those illustrated in FIG. 6. In some embodiments, as discussed herein, apparatus 10 may be configured to perform a procedure relating to UE power saving using RB sets, for example.

For instance, in some embodiments, apparatus 10 may be controlled by memory 14 and processor 12 to transmit to at least one user equipment (UE) a configuration for event based dormancy triggering and exit condition(s) for the dormancy. When a blocking event is detected for the at least one user equipment (UE) that has been configured to activate dormancy, apparatus 10 may be controlled by memory 14 and processor 12 to suspend uplink (UL) and/or downlink (DL) scheduling for the at least one user equipment (UE) and initiate a scheduling suspension timer.

In an example embodiment, apparatus 10 may be controlled by memory 14 and processor 12 to transmit, to the at least one UE, a configuration for DCI 2_0 monitoring when DCI 2_0 is enabled as an exit criteria from the dormancy state. According to one embodiment, the detection of the blocking event may be based on a number of consecutive instances with absence of downlink (DL) hybrid automatic repeat request (HARQ) feedback and/or periodic measurement reports.

In certain embodiments, upon expiry of the scheduling suspension timer, apparatus 10 may be controlled by memory 14 and processor 12 to initiate a guard timer that establishes a maximum time for short term blocking and, when the guard timer expires, to resume normal radio operation procedures including link failure detection mechanisms for the at least one UE.

In some embodiments, when the at least one UE is configured with a DCI 2_0 exit criteria, after the guard timer has started, apparatus 10 may be controlled by memory 14 and processor 12 to periodically transmit DCI 2_0 on the at least one UE's monitoring occasions. When a SR is received from the at least one UE, apparatus 10 may be controlled by memory 14 and processor 12 to stop the guard timer and resume normal operation. When no SR is received, the guard timer expires and apparatus 10 may be controlled by memory 14 and processor 12 to resume normal operation.

According to certain embodiments, when the at least one UE is configured with a SSB/CSI-RS exit criteria, after the guard timer has started, apparatus 10 may be controlled by memory 14 and processor 12 to, when a SR is received from the at least one UE, stop the guard timer and resuming normal operation. However, when no SR is received, the guard timer expires and apparatus 10 may be controlled by memory 14 and processor 12 to resume normal operation.

Figure 7B:
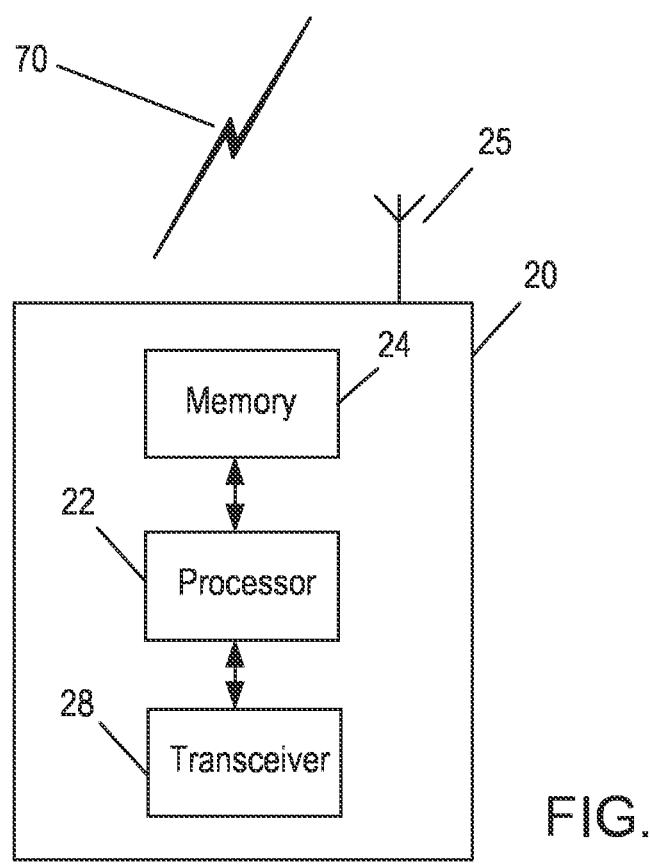
FIG. 7b illustrates an example block diagram of an apparatus, according to an embodiment.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 (or processing means) for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media, or other storage means. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 (or transceiving means) configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device) or input/output means. In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes or procedures depicted in any of the flow charts or signaling diagrams described herein, such as those illustrated in FIGS. 4, 5a, 5b and 5c. In certain embodiments, apparatus 20 may be configured to perform or execute procedure(s) relating to power saving using RB sets, for instance.

For example, in some embodiments, apparatus 20 may be controlled by memory 24 and processor 22 to receive a configuration for resource block (RB) sets, to monitor physical downlink control channel (PDCCH) for DCI on a primary RB set from among the RB sets and, when DCI is detected, to determine which of the RB sets are active or not active. In an embodiment, for an active RB set, apparatus 20 may be controlled by memory 24 and processor 22 to continue monitoring PDCCH and receiving channel state information reference signal (CSI-RS), transmitting physical uplink shared channel (PUSCH)/physical uplink control channel (PUCCH). In an embodiment, for an inactive RB set, apparatus 20 may be controlled by memory 24 and processor 22 to abstain from monitoring PDCCH and receiving channel state information reference signal (CSI-RS), transmitting physical uplink shared channel (PUSCH)/physical uplink control channel (PUCCH).

Therefore, certain example embodiments provide several technological improvements, enhancements, and/or advantages over existing technological processes and constitute an improvement at least to the technological field of wireless network control and management. For example, certain embodiments can significantly reduce UE power consumption, e.g., in scenarios with large bandwidths (e.g., wideband carriers or carrier aggregation). Furthermore, example embodiments provide a flexible framework for defining the frequency domain raster for UE dormancy, flexible and dynamic support for indicating in time domain when DL reception/UL transmissions are not expected from a UE. Additionally, certain embodiments do not require BWP change and do not suffer from BWP switching delay of 2 ms (R16). Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:

1. An apparatus, comprising:
   at least one processor; and
   at least one memory storing instructions that, when executed by the at least one processor, cause the apparatus at least to:
   receive a configuration for resource block (RB) sets comprising at least one primary RB set; monitor physical downlink control channel (PDCCH) for downlink control information (DCI) on the at least one primary RB set for indicating one or more active and inactive RB sets; and
   when DCI is detected, determine which of the RB sets are active or inactive, wherein the determined RB sets are considered active or inactive until a subsequent PDCCH monitoring occasion for DCI;
   wherein the apparatus is further caused to: for an inactive RB set, continue monitoring PDCCH in case the inactive RB set is configured as primary RB set.

2. An apparatus, comprising:
   at least one processor; and
   at least one memory storing instructions that, when executed by the at least one processor, cause the apparatus at least to:
   receive, from a serving node, a configuration for triggering event-based dormancy, the configuration comprising at least one dormancy triggering criteria and one or more exit conditions for the dormancy, wherein the dormancy comprises resource block (RB)-set dormancy;
   when the at least one dormancy triggering criteria is met, starting a user equipment dormancy state until at least one of the exit conditions are met; and
   wherein the at least one dormancy triggering criteria is based on at least one of:
   a certain number of consecutive scheduling requests without a response and no downlink transmission detected, or
   a certain number of consecutive synchronization signal/physical broadcast channel block (SSB)/channel state information-reference signal (CSI-RS) detection failures and no other downlink signals detected.

3. An apparatus, comprising:
   at least one processor; and
   at least one memory storing instructions that, when executed by the at least one processor, cause the apparatus at least to:
   transmit, to at least one user equipment, a configuration for event-based dormancy triggering and exit condition(s);
   when a blocking event is detected for the at least one user equipment that has been configured to activate RB set, suspend uplink and/or downlink scheduling for the at least one user equipment and initiate a scheduling suspension timer; and
   wherein, upon expiry of the scheduling suspension timer, the apparatus is further caused to:
   initiate a guard timer that establishes a maximum time for short term blocking; and
   when the guard timer expires, resume normal radio operation procedures including link failure detection mechanisms for the at least one user equipment.

4. The apparatus according to claim 3, wherein, when the at least one user equipment is configured with a DCI-based exit criterion, after the guard timer has started, the apparatus is further caused to:
   periodically transmit DCI indicating active and inactive RB set(s) or another DCI on the at least one user equipment's monitoring occasions;
   when a scheduling request is received from the at least one user equipment, stop the guard timer and resume normal operation;
   when no scheduling request is received, upon expiry of the guard timer resume normal operation.

5. The apparatus according to claim 3, wherein, when the at least one user equipment is configured with an SSB/CSI-RS-based exit criterion, after the guard timer has started, the apparatus is further caused to:
   when a scheduling request is received from the at least one user equipment, stop the guard timer and resume normal operation;
   when no scheduling request is received, upon expiry of the guard timer resume normal operation.

* * * * *